(12) United States Patent
Tang et al.

(10) Patent No.: US 6,441,999 B1
(45) Date of Patent: Aug. 27, 2002

(54) WEAR DURABILITY USING HIGH WEAR-RESISTANT SLIP PADS

(75) Inventors: Huan H. Tang, Los Altos; Jing Gui, Fremont, both of CA (US); Zine Eddine Boutaghou, Vadnais Heights; Jason W. Riddering, Prior Lake, both of MN (US); Kevin J. Grannen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/645,231

(22) Filed: Aug. 24, 2000

Related U.S. Application Data
(60) Provisional application No. 60/151,027, filed on Aug. 27, 1999.

(51) Int. Cl.$^7$ .................................................. G11B 5/60
(52) U.S. Cl. ................................................... 360/236.6
(58) Field of Search ........................... 360/235.8, 236.6

(56) References Cited

U.S. PATENT DOCUMENTS

| | | | |
|---|---|---|---|
| 4,833,001 A | 5/1989 | Kijima et al. ................ 428/141 |
| 4,837,923 A | 6/1989 | Brar et al. ..................... 29/603 |
| 4,858,043 A | 8/1989 | Kadokura et al. ........ 360/99.01 |
| 5,003,423 A | 3/1991 | Imamura et al. ............ 360/125 |
| 5,034,828 A * | 7/1991 | Ananth et al. ........... 360/236.6 |
| 5,079,657 A * | 1/1992 | Aronoff et al. .......... 360/236.6 |
| 5,099,372 A | 3/1992 | Kadokura et al. ........ 360/99.01 |
| 5,162,962 A | 11/1992 | Yamauchi et al. ..... 360/130.34 |
| 5,557,448 A | 9/1996 | Hamilton et al. ........... 360/104 |
| 5,670,253 A | 9/1997 | Chiu et al. ................... 428/336 |
| 5,673,161 A | 9/1997 | Yanagisawa et al. ....... 360/103 |
| 5,768,055 A | 6/1998 | Tian et al. ................... 360/103 |
| 5,793,568 A * | 8/1998 | Smith ...................... 360/236.6 |
| 5,841,608 A * | 11/1998 | Kasamatsu et al. ...... 360/236.6 |
| 5,870,251 A * | 2/1999 | Boutaghou .................. 360/103 |
| 5,936,799 A | 8/1999 | Kuratomi ................. 360/97.03 |
| 5,991,118 A | 11/1999 | Kasamatsu et al. ......... 360/103 |
| 5,994,035 A | 11/1999 | Tsukamoto et al. ......... 430/320 |
| 6,185,071 B1 * | 2/2001 | Asanai et al. ............ 360/236.6 |
| 6,188,547 B1 * | 2/2001 | Gui et al. ................ 360/236.5 |
| 6,212,042 B1 * | 4/2001 | Gui et al. ................ 360/236.6 |
| 6,215,621 B1 * | 4/2001 | Boutaghou ............... 360/236.6 |
| 6,236,543 B1 * | 5/2001 | Han et al. ................ 360/236.6 |
| 6,243,233 B1 * | 6/2001 | Yamamoto et al. ...... 360/236.6 |

\* cited by examiner

*Primary Examiner*—Jefferson Evans
(74) *Attorney, Agent, or Firm*—Schwegman, Lundberg, Woessner & Kluth, P.A.

(57) ABSTRACT

A disc drive includes a base and a disc rotatably attached to the base. The disc drive also includes an actuator assembly rotatably attached to said base and a device for moving the actuator assembly. The actuator assembly carries a slider. A slider for a disc drive adapted to interface with the surface of the disc. The surface of the disc is provided with an overcoat having a specific hardness. The slider has a leading edge, a trailing edge, and an air bearing surface positioned between the leading edge and the trailing edge. The slider includes a plurality of slider integrated pads, at least some of the slider integrated pads having a hardness which is greater than the hardness of the disc surface. All the slider integrated pads may be harder than the hardness of the disc surface or at least a group of slider integrated pads located near the trailing edge of the slider are harder than the hardness of the disc surface.

16 Claims, 5 Drawing Sheets

WEAR DURABILITY USING HIGH WEAR-RESISTANT SLIP PADS

RELATED APPLICATION

This application claims the benefit of U.S. Provisional Application Ser. No. 60/151,027, filed Aug. 27, 1999 under 35 U.S.C. 119(e).

FIELD OF THE INVENTION

The present invention relates to the field of mass storage devices. More particularly, this invention relates to a slider having an air bearing surface with high wear material pads and to the method for manufacturing the same.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track.

Generally, disc drives shut down in two ways. In the first type of disc drive, the actuator offloads a portion of an actuator arm to a ramp which in turn prevents the slider from contacting the disc when it stops. This type of disc drive is a ramp load/unload disc drive. The other type of disc drive is a contact start and stop ("CSS") disc drive. In a CSS disc drive, when the disc drive becomes nonoperational, the slider comes to rest on the disc surface, typically on a landing zone arranged at the inner or outer diameter of the disc, away from data tracks. At the onset of drive operation, the spindle motor has to provide enough power to overcome the static friction between the slider and the disc surface (also known as stiction in the magnetic recording industry). After the disc is rotated to the full operational speed, the slider is separated from the disc surface and flies above the disc surface to read or write information on data tracks. The contact start/stop functionality is often evaluated using a contact start/stop testing method in which the drive is operated to go through repeated starting and stopping modes for many cycles with a measurement of stiction at each CSS cycle.

The fly height between the discs and the sliders and included transducing heads during operation of the disc drive, has been reduced significantly during the last few years to achieve a higher recording density. Accordingly, it has been found to be necessary to form the disc surface to a very smooth finish to assure little or no head/disc contact during fly height operation of the disc drive. However, a smooth disc surface induces high stiction, especially with the existence of a liquid at the head/disc interface. Therefore, it is a common practice in the magnetic recording industry to roughen or texture the disc surface to reduce stiction during contact start and stop operations of the disc drive. Optimization of surface texturing has become a critical technology in disc drive manufacturing.

A further technology trend is to use a zone textured disc. In a zone textured disc, the landing zone (where the slider is resting when the drive is off) is textured by laser or other mechanical means. However, the data zone (containing the data tracks where the head is reading or writing information at a fly height) is either not textured or slightly textured to reduce the head/disc contact during the drive operation. This technique enables separate. optimization of each of the CSS landing zone and the data zone, to achieve lower head/disc spacing for a higher recording density, while reducing stiction encountered during contact stops and starts. When the zone textured discs are used in the drive, however, some special procedures have to be adopted during drive assembly to avoid a head from coming into contact with the disc surface within the data zone. Also, the actuator has to provide enough latch force to prevent the head from contacting the disc surface within the data zone during shipping and after the drive is turned off. If such contacts occur, the high stiction at the head/disc interface within the smooth data zone will prevent the drive from starting. In some cases, attempting to start the disc drive results in removing the slider from the actuator arm of the disc drive.

As magnetoresistive (MR) heads are introduced into disc drives, a layer of carbon overcoat is often applied to the slider surface to protect corrosion of read element and the write element. One of the side benefits of a carbon overcoat on the slider surface is that the stiction at the head/disc interface is also reduced significantly. The major drawback of a carbon overcoat, however, is that the effective head/disc spacing is also increased by an amount equal to the thickness of the carbon overcoat. Thus, there is a compromise between the head/disc magnetic spacing requirement and the stiction requirement for an optimal head/disc interface design.

In order to achieve ever higher magnetic recording density, a very smooth disc surface has to be used and the thickness of the carbon overcoat on the slider surface has to be reduced to a minimum amount. Two important issues have to be resolved to achieve the above objectives: lower stiction at the head/disc interface when a smooth disc is used and protection of the read/write elements against environmental corrosion when an MR head is used.

One solution proposed in the prior art is described in "Stiction Free Slider for the Smooth Surface Disc" (IEEE Transactions On Magnetics, Vol. 31, No. Nov. 6, 1995). The IEEE article illustrates a slider having three separated and isolated cylindrical carbon overcoat pads. One of the pads is formed at the center of one end of the slider, and the other two pads are formed at the other end of the slider, spaced from one another, with each pad being proximate to one of the side edges of the slider. The IEEE article states that the three isolated pads reduce stiction at head/disc interface when a smooth surface disc is used in the disc drive. However, the three, isolated pad arrangement described in the IEEE article has several drawbacks.

First the effectiveness of the pads depends on the profile orientation (crown, camber and twist) of the slider. For a wide range of slider profiles, which are typically encountered in a practical manufacturing environment, parts of the slider other than the pad locations, may be in contact with the disc surface. In that case the stiction at the head/disc interface will be very high. Secondly, there is no back-up support for the head/disc interface once one of the pads is worn away or becomes defective. Finally, for a laser zone textured disc, the disc surface has a discrete surface texture, and the use of a few spaced and isolated pads will not result in head/disc contact only at a pad location of the slider.

Another solution has been to provide a number of carbon overcoat pads or protrusions. A carbon overcoat is applied to the ABS surface in an array of individual carbon overcoat protrusions that are spaced across the slider surface and comprise a small and discrete area of the ABS surface. This technology is referred to as SLIP (slider integrated pads). Generally, the carbon overcoat protrusions comprise a total surface area equal to approximately 1% to approximately 15% of the total surface area of the slider. Each carbon overcoat protrusion is of a thickness sufficient to assure that head/disc contact only occurs where there is one or more carbon overcoat protrusions, but thin enough to have little effect on the flying characteristics of the slider. Using SLIP, the contact area of the head/disc interface is limited to the 1% to 15% total area provided by the array of carbon overcoat protrusions to reduce stiction at head/disc interface.

The use of carbon overcoat type slider integrated pads has several disadvantages. Among the disadvantages are that the slider integrated pads made of carbon, such as diamond like carbon wear over time or over the life of the disc drive. The root cause of stiction is the backward tipping of the slider or head. Excessive pad wear exacerbates the problem of backward tipping. In addition, the gap between the transducer housed in the slider and the disc changes during the life of the disc drive. Currently, discs may be provided with a relatively hard carbon overcoat that may be harder than the slider integrated pads. This may lead to excessive pad wear and to backward tipping and stiction.

In the current SLIP design, the pads are made of diamond-like carbon (DLC) by means of ion beam deposition. With a typical hardness of 25 GPa, the DLC pads are indeed harder than carbon overcoat on media, whose hardness ranges from around 10 GPa for sputtered carbon and around 14 GPa for ion beam carbon. However, as the total pad area for a SLIP head is less than 10,000 $\mu m^2$, it always represents a challenge to design a disc, with or without shallow LZT, that will meet the goal of limiting pad wear to below 50 Å after repeated contact start-stop operations. For media coated with ion beam carbon, which is superior to sputtered carbon in preventing corrosion problems, pad wear is particularly severe, in part due to its DLC-like hardness. Higher media overcoat hardness leads to substantially accelerated pad wear in contact start-stop testing.

The hardness of carbon can be controlled in some processes. In ion beam deposition, the harder carbon is formed by increasing the bias voltage during the process of ion beam deposition. In other words, the higher the bias voltage, the greater the hardness of the slider integrated pads formed. Making pads of harder carbon is not the solution, however, since pads of harder carbon wear more than pads of less hard carbon. For example, slider integrated pads formed at approximately 120 volts of bias voltage wear more than 200 angstroms after approximately 10,000 start stop cycles. In contrast, slider integrated pads formed at approximately 0 volts of bias voltage wear more than about 50 angstroms after approximately 10,000 start stop cycles. Therefore, merely making the slider integrated pads of harder carbon is not a solution since the slider integrated pads of harder carbon tend to wear more than the other carbon slider integrated pads.

What is needed is a slider having an air bearing surface that includes slider integrated pads that prevent the slider from backward tipping as the slider integrated pads wear over time. What is also needed is a slider having slider integrated pads that prevent stiction problems. Still further, what is needed is a slider that has a more consistent gap distance between the magnetic transducer and the disc over the life of the disc drive.

SUMMARY OF THE INVENTION

A disc drive includes a base and a disc rotatably attached to the base. The disc includes an overcoat material on the disc. The overcoat material has a first hardness. The disc drive also includes an actuator having a slider with an air bearing surface. The air bearing surface is provided with at least one slider integrated pad having a second hardness that is greater than the first hardness. In one embodiment, the at least one slider integrated pad is formed from SiC. The slider further includes a leading edge and a trailing edge. The at least one slider integrated pad is located near the trailing edge of the slider. There also may be at least one group of slider integrated pads formed from SiC. A first group of slider integrated pads is formed from SiC, and a second group of slider integrated pads is formed from diamond like carbon. The first group of slider integrated pads is located near the trailing edge of the slider. The at least one slider integrated pad is formed from SiC and the overcoat on the disc is formulated of carbon sputtered onto the surface of the disc. The overcoat may also be formulated of carbon deposited onto the surface of the disc in the presence of a bias voltage.

A slider for a disc drive is adapted to interface with an interface surface having a specific hardness. The slider includes a leading edge, a trailing edge, an air bearing surface positioned between the leading edge and the trailing edge of the slider. In addition, a plurality of slider integrated pads are positioned on the air bearing surface and at least some of the slider integrated pads having a hardness which is greater than the hardness of the interface surface. The slider integrated pads having a hardness which is greater than the hardness of the interface surface are located proximate the trailing edge of the slider. These slider integrated pads located proximate the trailing edge of the slider wear less than less hard slider integrated pads. The slider integrated pads have a hardness which is greater than the hardness of the interface surface. The slider integrated pads are formed of SiC.

In addition, a method of forming a slider having a leading edge, a trailing edge, and an air bearing surface includes the steps of forming a first set of slider integrated pads having a first hardness, and forming a second set of slider integrated pads having a second hardness different than the first. The harder slider integrated pads of the first or second set of slider integrated pads are formed near the trailing edge of the slider. The forming step further includes providing a mask which includes an array of openings for forming the first set of slider integrated pads, and depositing a material onto the mask and through the openings in the mask to form the first set of slider integrated pads. The forming step also includes providing a mask which includes an array of openings for forming the second set of slider integrated pads. The mask covers the first slider integrated pads. A material is then deposited onto the mask and through the openings in the mask to form the second set of slider integrated pads.

Advantageously, a slider having an air bearing surface that includes slider integrated pads made of SiC prevents the slider from backward tipping as the slider integrated pads wear over time. Thus the slider integrated pads made of SiC help to prevent stiction problems. In addition, the slider that includes slider integrated pads made of SiC has a more consistent gap distance between the magnetic transducer and the disc over the life of the disc drive.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
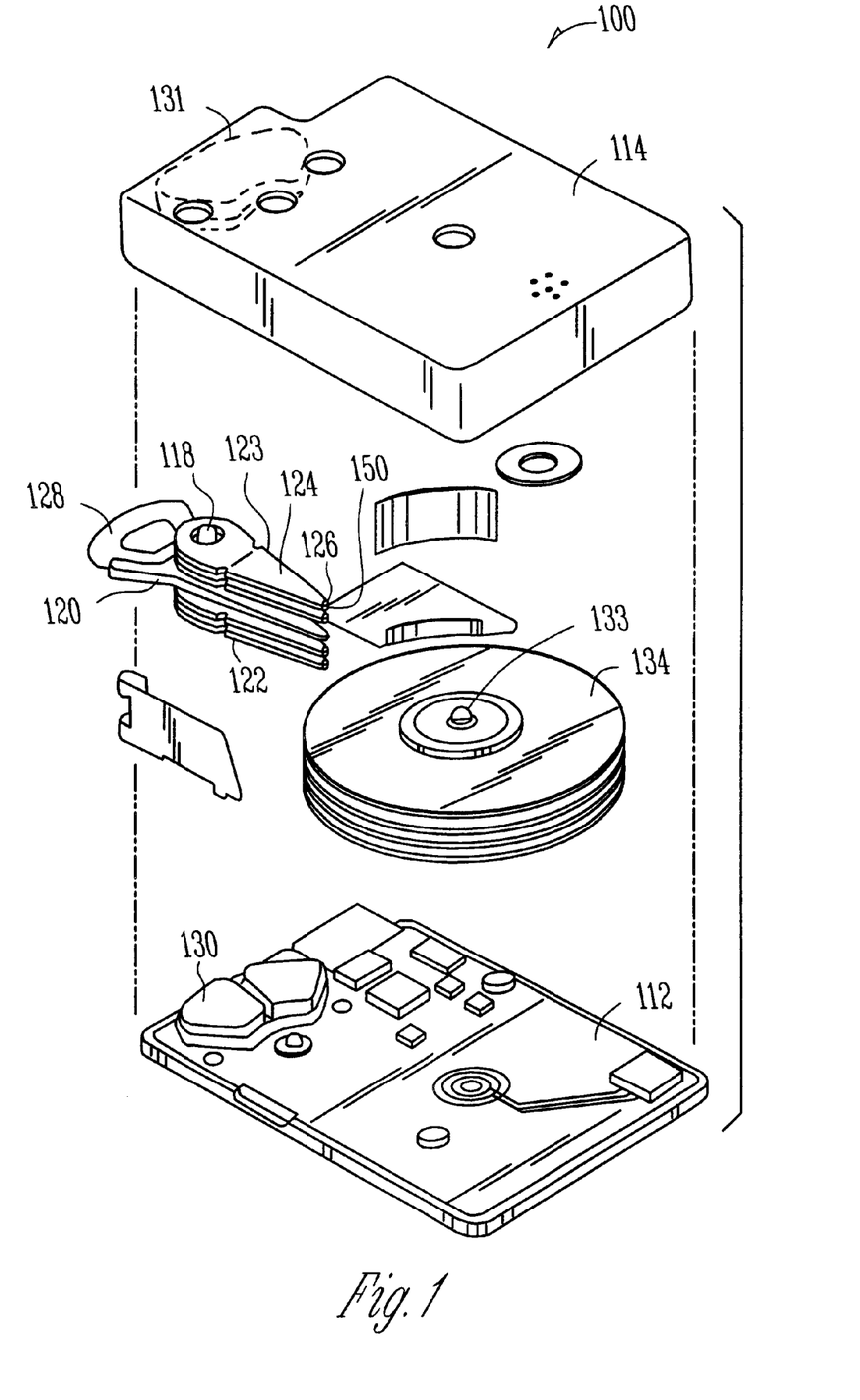
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
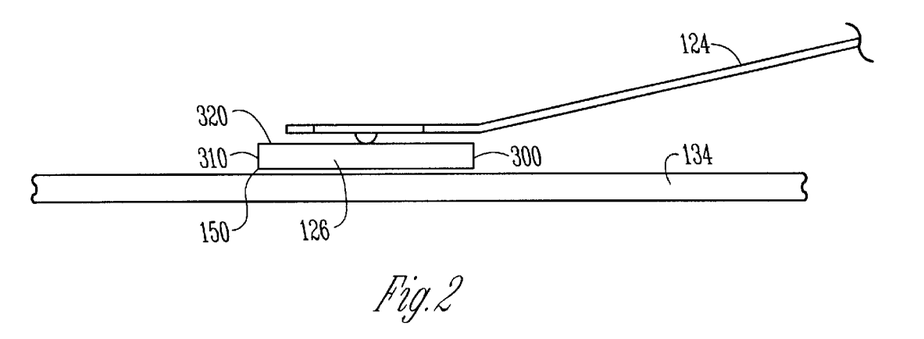
FIG. 2 is a side view of a load spring and slider in transducing relation with the disc.

FIG. 2 is a side view of a load spring 124 and slider 126 in transducing relation with the disc 134. The load spring 124 is a triangular structure which acts as a cantilevered spring to place a small load onto the slider 126 when the slider 126 is in transducing relationship with the disc 134. The load spring 124 is attached at its wider end to an actuator arm 123. The load spring 124 shown in FIG. 2 has a swage opening 210 and a swage plate 212 in the wider end. The swage opening 210 and swage plate 212 are used to attach the load spring 124 by a process referred to as swaging. Other attachment methods may also be used without departing from the spirit of this invention. The tang 152 is attached to a free end 220 of the load spring 124. The transducer 150 is carried by or within the slider 126.

Figure 3:
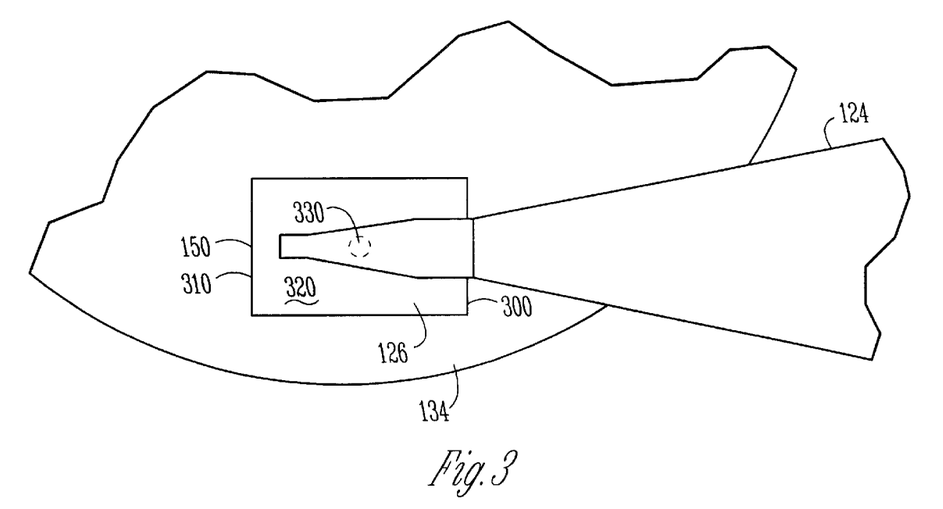
FIG. 3 is a top view of the slider and disc.

FIG. 3 is a top view of the slider 126 and disc 134. The slider 126 includes a leading edge 300 and a trailing edge 310. When the slider 126 is in transducing relation with the disc 134, the slider 126 flies or passes over the disc 134 with the leading edge 300 facing forward. The slider 126 also includes a gimbaling surface 320. The gimbaling surface 320 is the surface that a gimbal dimple 330 contacts while the slider 126 is in transducing relation with respect to the disc.

Figure 4:
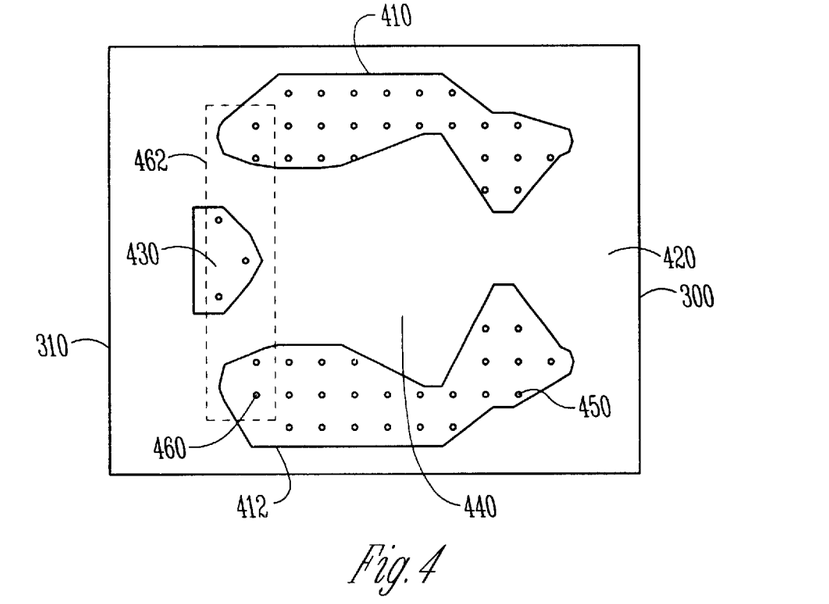
FIG. 4 is a bottom view of the slider which shows an air-bearing surface.

FIG. 4 is a bottom view of the slider 126 which shows an air-bearing surface 400. The air-bearing surface 400 is the portion of the slider 126 which is nearest to the disc 134 (shown in FIG. 3). The air-bearing surface 400 includes a first side rail 410 and a second side rail 412 which are located near the sides of the slider 126. The air-bearing surface 400 also includes a leading tapered step 420 which is positioned near the leading edge 300 of the slider 126. The air-bearing surface 400 also includes a center pad 430 which is positioned near the trailing edge 310 of the slider 126. Between the side rail 410 and the side rail 412 and the leading tapered step 420, is a cavity or slightly depressed area 440. When the disc 134 is rushing past the air-bearing surface 400 of the slider 126, there are high pressure areas and low pressure areas formed at the air-bearing surface 400. The high pressure areas include the leading tapered step 420, the first side rail 410 and the second side rail 412. Another high pressure area is the center pad 430. Air rushing past the cavity 440 produces a negative pressure or suction force. As a result, the pressure in the cavity 440 area is low and, therefore, the cavity is referred to as the low pressure area of the air-bearing surface 400. A high suction slider 126 is one that produces a relatively high negative pressure area 440. High suction bearings, as mentioned previously, are very desirable since there is less variance in fly height when using a high suction bearing and since the fly height profile is relatively flat despite the fact that the slider 126 is positioned at various radial positions from the center of the disc 134. In addition, the high suction air-bearing sliders 126 have less altitude sensitivity.

The air bearing surface 400 also includes slider integrated pads 450 and 460. The slider integrated pads 460 positioned closest to the trailing edge 310 of the slider 126 are made from a material that is harder than diamond like carbon. The slider integrated pads 460 within the box depicted by the dotted line 462 are the slider integrated pads positioned near the trailing edge of the slider 126. In one embodiment, the other slider integrated pads 450 on the air bearing surface are made of diamond like carbon. In another embodiment, all the slider integrated pads 450 and 460 are made of a material harder than diamond like carbon. The material harder than diamond like carbon includes SiC, SiN, or other material that can be deposited on the air bearing surface of the slider 126.

Figure 5:
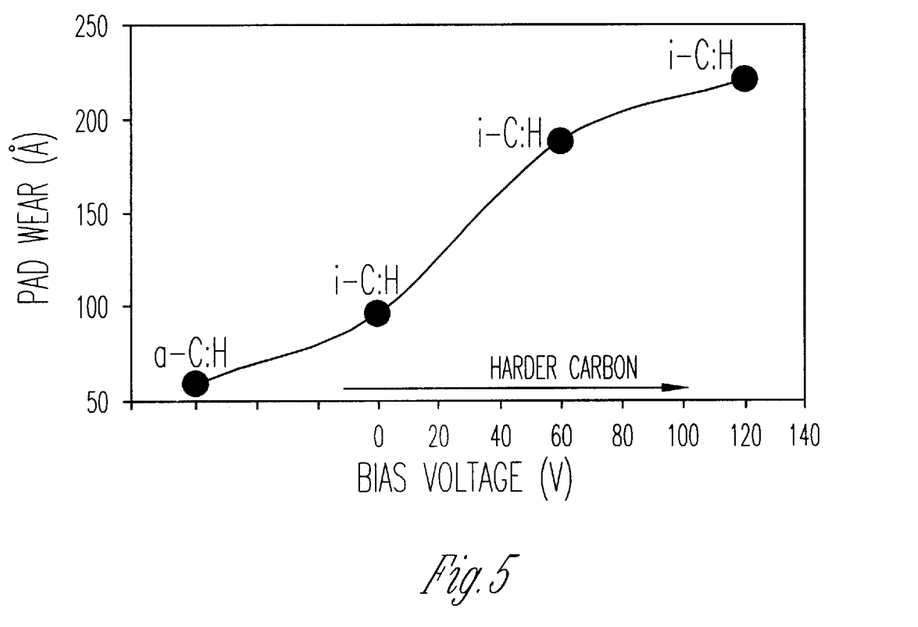
FIG. 5 is a chart of the pad wear of diamond like carbon slider integrated pads verses the particular bias voltage on the carbon on the disc.

Carbon overcoats are also provided on the disc 134 (shown in FIGS. 1–3). The carbon overcoats are placed on the disc 134 with different bias voltages which in turn results in different hardness of the disc 134. FIG. 5 depicts the pad wear of diamond like carbon slider integrated pads for a particular bias voltage on the carbon on the disc 134. In other words, there is a wide variance in the pad wear for diamond like carbon given the different hardness of the carbon overcoat on the disc. As shown in FIG. 5, the wear on the slider integrated pads ranges from 50–250 Angstroms. It is desirable to limit this wear to approximately 50 Angstroms so as to maintain constant stiction characteristics of the head-disc interface. Using material that is harder than diamond like carbon, such as SiC, for the slider integrated pads 460 positioned near the trailing edge prevents excessive wear of the slider integrated pads 460 so that satisfactory stiction performance of the head-disc interface can be maintained over the life of the disc drive 100.

Figure 6:
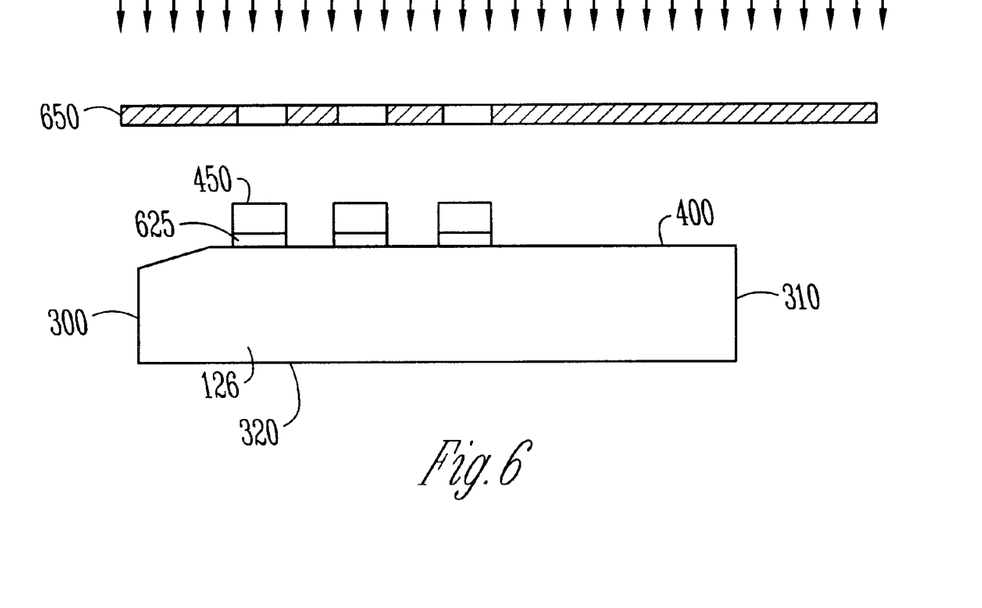
FIG. 6 shows a first step in the formation of one embodiment of the slider 126 air bearing surface in which the forward slider integrated pads are made of diamond like carbon and the other slider integrated pads are made of SiC.
Figure 7:
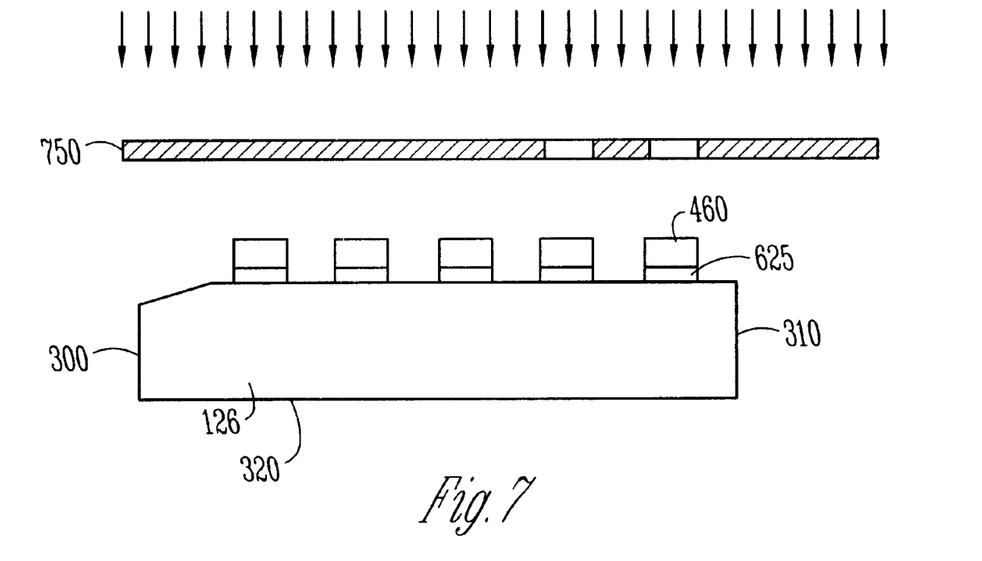
FIG. 7 shows a second step in the formation of one embodiment of the slider 126 air bearing surface in which the forward slider integrated pads are made of diamond like carbon and the other slider integrated pads are made of SiC.

FIGS. 6 and 7 show the formation of one embodiment of the slider 126 air bearing surface in which the forward slider integrated pads 450 are made of diamond like carbon and the other slider integrated pads 460 are made of SiC. FIG. 6 shows a first step in the formation of one embodiment of the slider 126 air bearing surface in which the forward slider integrated pads 450 are made of diamond like carbon and the other slider integrated pads 460 are made of SiC. The diamond like carbon array of slider integrated pads 450 is applied to the slider surface following the process flow shown in FIG. 6. A metal mask 650 with circular holes in an array to form slider integrated pads 450 is placed adjacent to the air bearing surface 400 of the slider. Then diamond like carbon is deposited on the slider air bearing surface 400 through the mask holes by a deposition process such as, for example, chemical vapor deposition (CVD), sputtering, or ion beam deposition. First a layer of $SiO_2$ 625 is deposited on the slider surface through the metal mask 650 and then a layer of diamond like carbon is deposited on the top of the $SiO_2$ layer to form the bumps of slider integrated pads 450. In another exemplary embodiment, no $SiO_2$ layer is applied, and only diamond like carbon is applied to the slider air bearing surface 400, provided however that the adhesion between diamond like carbon and the slider is strong enough.

FIG. 7 shows the second step in the formation of one embodiment of the slider 126 air bearing surface in which the forward slider integrated pads are made of diamond like carbon and the other slider integrated pads are made of SiC. The SiC array of slider integrated pads 460 is applied to the slider surface following the process flow shown in FIG. 7. A second metal mask 750 with circular holes in an array to form slider integrated pads 460 is placed adjacent to the air bearing surface 400 of the slider. Then SiC is deposited on the slider air bearing surface 400 through the mask holes by a deposition process such as, for example, chemical vapor deposition (CVD), sputtering, or ion beam deposition. First a layer of $SiO_2$ 625 is deposited on the slider surface through the metal mask 750 and then a layer of SiC is deposited on the top of the $SiO_2$ layer to form the bumps of slider integrated pads 460. In another exemplary embodiment, no $SiO_2$ layer is applied, and only SiC is applied to the slider air bearing surface 400, provided however that the adhesion between SiC and the slider is strong enough.

Figure 8:
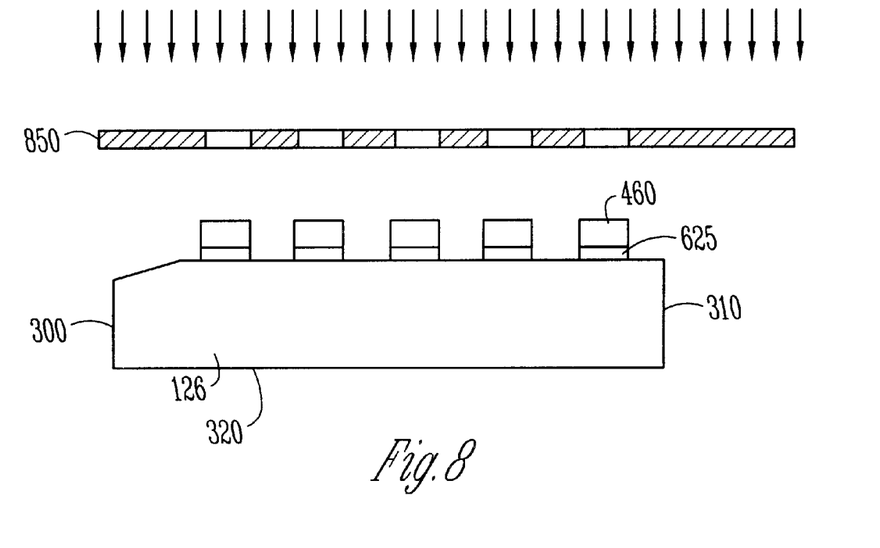
FIG. 8 shows the formation of another embodiment of the slider air bearing surface in which all the slider integrated pads are made of SiC.

FIG. 8 shows the formation of another embodiment of the slider 126 air bearing surface in which all the slider integrated pads 450, 460 are made of SiC. The following is a description of an exemplary embodiment of the present invention. The SiC array of slider integrated pads 450, 460 is applied to the slider surface following the process flow shown in FIG. 8. A metal mask 850 with circular holes is placed adjacent to the air bearing surface 400 of the slider 126. Then SiC is deposited on the slider air bearing surface 400 through the mask holes by a deposition process such as, for example, chemical vapor deposition (CVD), sputtering, or ion beam deposition. First a layer of $SiO_2$ 25 is deposited on the slider air bearing surface 400 through the metal mask 850 and then the layer of SiC is deposited on the top of the $SiO_2$ layer to form the bumps or slider integrated pads 450, 460. Then the slider is transferred to other conventional processes to finish the slider fabrication. In another exemplary embodiment, no $SiO_2$ layer is applied, and only SiC is applied to the slider air bearing surface 400, provided however that the adhesion between SiC and the slider air bearing surface 400 is sufficiently strong to last the life of the disc drive through the selected number of cycles of start and stop.

Advantageously, a slider having an air bearing surface that includes slider integrated pads made of SiC prevents the slider from backward tipping as the slider integrated pads wear more slowly over time. Thus the slider integrated pads made of more durable SiC help to prevent stiction problems. In addition, the slider that includes slider integrated pads made of SiC has a more consistent gap distance between the magnetic transducer and the disc over the life of the disc drive.

Figure 9:
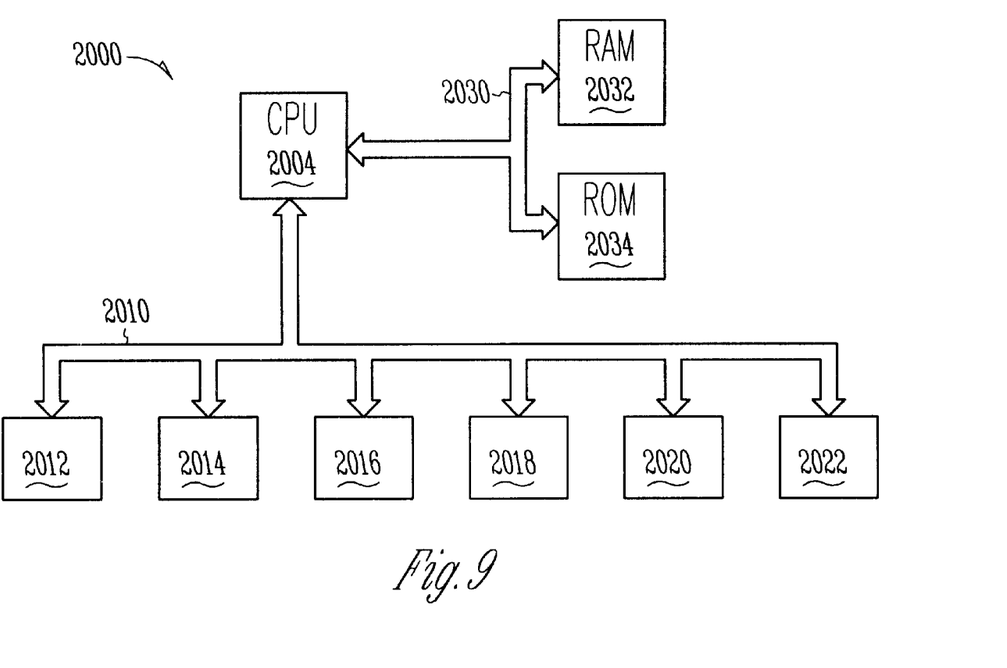
FIG. 9 is a schematic view of a computer system.

FIG. 9 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

In conclusion, a disc drive includes a base 112 and a disc 134 rotatably attached to the base 112. The disc includes an overcoat material on the disc 134. The overcoat material has a first hardness. The disc drive also includes an actuator 120 having a slider 126 with an air bearing surface 400. The air bearing surface 400 is provided with at least one slider integrated pad 450, 460 having a second hardness that is greater than the first hardness. In one embodiment, the at least one slider integrated pad 460 is formed from SiC. The slider 126 further includes a leading edge 300 and a trailing edge 310. The at least one slider integrated pad 460 is located near the trailing edge 310 of the slider 126. There also may be at least one group of slider integrated pads 460 formed from SiC. A first group of slider integrated pads 460 is formed from SiC, and a second group of slider integrated pads 450 is formed from diamond like carbon. The first group of slider integrated pads 460 is located near the trailing edge 310 of the slider 126. The at least one slider integrated pad 460 is formed from SiC and the overcoat on the disc 134 is formulated of carbon sputtered onto the surface of the disc 134. The overcoat may also be formulated of carbon deposited onto the surface of the disc 134 in the presence of a bias voltage.

A slider for a disc drive is adapted to interface with an interface surface having a specific hardness. The slider 126 includes a leading edge 300, a trailing edge 310, an air bearing surface 400 positioned between the leading edge 300 and the trailing edge 310 of the slider 400. In addition, a plurality of slider integrated pads 450, 460 are positioned on the air bearing surface 400 and at least some of the slider integrated pads 450, 460 having a hardness which is greater than the hardness of the interface surface. The slider integrated pads having a hardness which is greater than the hardness of the interface surface are located proximate the trailing edge 310 of the slider 126. These slider integrated pads 460 located proximate the trailing edge 310 of the slider 126 wear less than less hard slider integrated pads. The slider integrated pads 460 have a hardness which is greater than the hardness of the interface surface. The slider integrated pads 460 are formed of SiC.

A method of forming a slider 126 having a leading edge 300, a trailing edge 319, and an air bearing surface 400 includes the steps of forming a first set of slider integrated pads 460 having a first hardness, and forming a second set of slider integrated pads 450 having a second hardness different than the first. The harder slider integrated pads of the first 460 or second set of slider integrated pads 450 are formed near the trailing edge of the slider. The forming step further includes providing a mask 650 which includes an array of openings for forming the first set of slider integrated pads 460, and depositing a material onto the mask 650 and through the openings in the mask 650 to form the first set of slider integrated pads 460. The forming step also includes providing a mask 750 which includes an array of openings for forming the second set of slider integrated pads 450. The mask 750 covers the first slider integrated pads 460. A material is then deposited onto the mask 750 and through the openings in the mask 750 to form the second set of slider integrated pads 450.

Most generally, a slider 126 includes an air bearing surface 400, a trailing edge 310, and an apparatus located on the air bearing surface 400 near the trailing edge 310 of the slider 126 for preventing stiction.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A disc drive comprising:

a base;

a disc rotatably attached to the base, an overcoat material on the disc, the overcoat material having a first hardness;

an actuator having a slider with an air bearing surface and a trailing edge, the air bearing surface provided with at least one slider integrated pad having a second hardness that is greater than the first hardness which is positioned on the air bearing surface near the trailing edge of the slider, wherein the at least one slider integrated pad is formed from SiC, the at least one slider integrated pad having an end attached to the air bearing surface and a distal end, the SiC positioned at the distal end of the at least one slider integrated pad.

2. The disc drive of claim 1 wherein slider further includes a plurality of slider integrated pads located near the trailing edge of the slider.

3. A disc drive comprising:

a base;

a disc rotatably attached to the base, an overcoat material on the disc, the overcoat material having a first hardness;

an actuator having a slider with an air bearing surface and a trailing edge, the air bearing surface provided with at least one slider integrated pad having a second hardness that is greater than the first hardness which is positioned on the air bearing surface near the trailing edge of the slider, wherein the at least one slider integrated pad is formed from a material having a hardness greater than diamond like carbon selected from the group consisting of SiC and SiN the at least one slider integrated pad having an end attached to the air bearing surface and a distal end, the material having a hardness greater than diamond like carbon positioned at the distal end of the at least one slider integrated pad.

4. A disc drive comprising:

a base;

a disc rotatably attached to the base, an overcoat material on the disc, the overcoat material having a first hardness; and an actuator having a slider with an air bearing surface, the air bearing surface provided with at least one slider integrated pad having a second hardness that is greater than the first hardness, the air bearing surface having a plurality of slider integrated pads further comprising:
 a first group of slider integrated pads formed from SiC; and
 a second group of slider integrated pads formed from diamond like carbon.

5. The disc drive of claim 4 wherein the slider further includes a leading edge and a trailing edge, the first group of slider integrated pads located near the trailing edge of the slider.

6. A disc drive comprising:

a base;

a disc rotatably attached to the base, an overcoat material on the disc, the overcoat material having a first hardness;

an actuator having a slider with an air bearing surface and a trailing edge, the air bearing surface provided with at least one slider integrated pad having a second hardness that is greater than the first hardness which is positioned on the air bearing surface near the trailing edge of the slider, wherein the at least one slider integrated pad includes a tip formed from SiC and the overcoat on the disc is formulated of carbon sputtered onto the surface of the disc.

7. A disc drive comprising:

a base;

a disc rotatably attached to the base, an overcoat material on the disc, the overcoat material having a first hardness;

an actuator having a slider with an air bearing surface and a trailing edge, the air bearing surface provided with at least one slider integrated pad having a second hardness that is greater than the first hardness which is positioned on the air bearing surface near the trailing edge of the slider, wherein the at least one slider integrated pad includes a tip formed from SiC and the overcoat on the disc is formulated of carbon deposited onto the surface of the disc in the presence of a bias voltage.

8. A slider for a disc drive adapted to interface with an interface surface having a specific hardness comprising:

a leading edge;

a trailing edge;

an air bearing surface positioned between the leading edge and the trailing edge of the slider; and a plurality of slider integrated pads further comprising:
 a first group; and
 a second group, wherein the first group has a first hardness which is greater than the hardness of the interface surface and wherein the second group has a second hardness different from the first hardness.

9. The slider of claim 8 wherein the slider integrated pads having a hardness which is greater than the hardness of the interface surface are located proximate the trailing edge of the slider.

10. The slider of claim 8 wherein the slider integrated pads having a hardness which is greater than the hardness of the interface surface are located proximate the trailing edge of the slider so that the slider integrated pads proximate the trailing edge of the slider wear less than less hard slider integrated pads.

11. The slider of claim 8 wherein the slider integrated pads having a hardness which is greater than the hardness of the interface surface is formed from a material selected from the group consisting of SiC and SiN.

12. The slider of claim 8 wherein the slider integrated pads having a hardness which is greater than the hardness of the interface surface are formed of SiC.

13. A method of forming a slider having a leading edge, a trailing edge, and an air bearing surface, the method comprising the steps of:

(a) forming a first set of slider integrated pads having a first hardness; and (b) forming a second set of slider integrated pads having a second hardness different than the first.

14. The method of claim 13 wherein the harder slider integrated pads of the first or second set of slider integrated pads are formed near the trailing edge of the slider.

15. The method of claim 13 wherein the forming step (a) further comprises the steps of:

(a)(i) providing a mask which includes an array of openings for forming the first set of slider integrated pads; and (a)(ii) depositing a material onto the mask and through the openings in the mask to form the first set of slider integrated pads.

16. The method of claim 15 wherein the forming step (b) further comprises the steps of:

(b)(i) providing a mask which includes an array of openings for forming the second set of slider integrated pads, the mask covering the first slider integrated pads; and (b)(ii) depositing a material onto the mask and through the openings in the mask to form the second set of slider integrated pads.

* * * * *